United States Patent
Hisazumi et al.

(10) Patent No.: US 10,661,238 B2
(45) Date of Patent: May 26, 2020

(54) CONTINUOUS PARTICLE MANUFACTURING DEVICE

(71) Applicant: KABUSHIKI KAISHA POWREX, Hyogo (JP)

(72) Inventors: Koji Hisazumi, Hyogo (JP); Koji Hasegawa, Hyogo (JP); Takuya Nagato, Hyogo (JP); Makoto Kobayashi, Hyogo (JP)

(73) Assignee: KABUSHIKI KAISHA POWREX, Hyogo (JP)

( * ) Notice: Subject to any disclaimer, the term of this patent is extended or adjusted under 35 U.S.C. 154(b) by 241 days.

(21) Appl. No.: 15/572,933

(22) PCT Filed: Jun. 23, 2016

(86) PCT No.: PCT/JP2016/068607
§ 371 (c)(1),
(2) Date: Nov. 9, 2017

(87) PCT Pub. No.: WO2017/002694
PCT Pub. Date: May 1, 2017

(65) Prior Publication Data
US 2018/0154323 A1    Jun. 7, 2018

(30) Foreign Application Priority Data

Jun. 30, 2015 (JP) .................. 2015-131036

(51) Int. Cl.
*B01J 8/14* (2006.01)
*B01J 2/16* (2006.01)
(Continued)

(52) U.S. Cl.
CPC . *B01J 2/16* (2013.01); *B01J 2/30* (2013.01); *B07B 4/02* (2013.01); *B07B 9/02* (2013.01);
(Continued)

(58) Field of Classification Search
CPC ..... B01D 1/18; B29C 45/4457; B29C 45/105; B01J 2/00; B01J 2/02; B01J 2/16
See application file for complete search history.

(56) References Cited

U.S. PATENT DOCUMENTS 5,316,735 A    5/1994 Ivanov et al.
5,946,818 A    9/1999 Baxter et al.
(Continued)

FOREIGN PATENT DOCUMENTS

EP    0 655 597    5/1995
JP    62-130727    8/1987
(Continued)

OTHER PUBLICATIONS

Extended European Search Report dated Feb. 18, 2019 in corresponding European Patent Application No. 16817802.8.
(Continued)

*Primary Examiner* — Joseph S Del Sole
*Assistant Examiner* — Thu Khanh T Nguyen
(74) *Attorney, Agent, or Firm* — Wenderoth, Lind & Ponack, L.L.P.

(57) ABSTRACT

A continuous particle manufacturing apparatus comprises a particle drawing section configured to draw particles out of a processing container, a sorting section configured to sort the particles drawn by the particle drawing section into processed particles and unprocessed particles, a discharge section to which the processed particles sorted out by the sorting section are discharged, and a particle returning section configured to return, into the processing container, the unprocessed particles sorted out by the sorting section, the particle returning section being configured to blow the unprocessed particles toward an inner wall surface of the processing container together with an air stream.

9 Claims, 10 Drawing Sheets

(51) Int. Cl.
   *B07B 4/02* (2006.01)
   *B07B 9/02* (2006.01)
   *B01J 2/30* (2006.01)

(52) U.S. Cl.
   CPC ............ *B01J 2208/00539* (2013.01); *B01J 2208/00769* (2013.01)

(56) References Cited

U.S. PATENT DOCUMENTS

2001/0040305 A1\* 11/2001 Moschini ............ B29C 45/4457 264/6
2013/0253217 A1\* 9/2013 Ishii ...................... B01J 23/002 558/319

FOREIGN PATENT DOCUMENTS

| JP | 6-19836 | 3/1994 |
| JP | 6-85031 | 12/1994 |
| JP | 09-220460 | 8/1997 |
| JP | 11-33384 | 2/1999 |
| JP | 2002-45675 | 2/2002 |
| JP | 2003-038948 | 2/2003 |
| JP | 2004-122057 | 4/2004 |
| JP | 2004-174481 | 6/2004 |
| JP | 2006-263543 | 10/2006 |
| JP | 3894686 | 3/2007 |
| JP | 3907605 | 4/2007 |
| JP | 4658652 | 3/2011 |
| JP | 2016-26867 | 2/2016 |

OTHER PUBLICATIONS

International Search Report dated Aug. 16, 2016 in International (PCT) Application No. PCT/JP2016/068607.
International Preliminary Report on Patentability and Written Opinion of the International Searching Authority dated Jan. 2, 2018 in International (PCT) Application No. PCT/JP2016/068607.
Japanese Office Action dated Aug. 3, 2018 in corresponding Japanese Patent Application No. 2015-131036 with English translation.

\* cited by examiner

CONTINUOUS PARTICLE MANUFACTURING DEVICE

TECHNICAL FIELD

The present invention relates to a continuous particle manufacturing apparatus configured to continuously manufacture granulated or coated particles from powder particles in a variety of manufacturing fields, such as fields of pharmaceutical preparations, chemicals, food products, agricultural chemicals, feed, cosmetics, and fine chemicals.

BACKGROUND ART

As the apparatus configured to continuously manufacture granulated or coated particles, there have been known manufacturing apparatus adopting a so-called spray granulation system in which a raw material solution obtained by dispersing or dissolving raw material powder is sprayed from a spray nozzle and dried in a processing container (Patent Literatures 1 to 4 described below).

In an apparatus disclosed in Patent Literature 1, an ejector is arranged below a nozzle configured to spray a raw material solution. The ejector includes an introducing tube, and a blowing tube from which hot air is blown into the introducing tube. Fine particles or small-diameter granules in a fluidization chamber are guided by the ejector to the vicinity of the nozzle, and are coated with spray liquid droplets sprayed from the nozzle. Further, the ejector increases kinetic energy of the fine particles or the small-diameter granules at the vicinity of the nozzle, thereby preventing adhesion of the particles. The particles subjected to coating process in the fluidization chamber are fed through a discharge port to a classification mechanism, whereas the fine particles or the small-diameter granules that do not attain to predetermined particle diameter and weight are blown up by air supplied into the classification mechanism, and are returned to the fluidization chamber.

In an apparatus disclosed in Patent Literature 2, near an upper end of a conical portion of a spray drying section, there is provided a part configured to introduce an air stream downward or obliquely downward along an inner surface of the conical portion. Dried powder, which adheres to the inner surface of the conical portion after completion of a drying step, is blown off by the air stream introduced from the air stream introducing part. In this manner, the dried powder is forcibly transferred to a fluidizing and granulating section provided below the spray drying section, and is prevented from adhering to and accumulating on the inner surface of the conical portion. A cyclone is arranged in a halfway portion of an exhaust gas line, and fine powder mixed in an exhaust gas is collected by the cyclone to be returned to the fluidized bed granulating section.

In an apparatus disclosed in Patent Literature 3, there are provided a plurality of jet nozzles configured to blow a high-pressure gas toward a fluidized bed of powder in a granulation chamber. With this configuration, aggregation of particles is prevented.

In an apparatus disclosed in Patent Literature 4, there are provided a plurality of nozzles configured to jet a fluid toward an inner wall surface of a granulation chamber. The fluid to be jetted from the nozzles can be switched among a gas, a liquid, and steam.

CITATION LIST

Patent Literature 1: JP 4658652 B2
Patent Literature 2: JP 2002-45675 A
Patent Literature 3: JP 3894686 B2
Patent Literature 4: JP 3907605 B2

SUMMARY OF INVENTION

Technical Problem

When highly adhesive particles, such as particles having viscosity or fine particles having a small particle diameter, are subjected to granulation process or coating process in a processing container, there often arises a problem of adhesion of the particles to an inner wall surface of the processing container. In particular, when the particles are damped by a spray of the raw material solution, a binder solution, or a coating solution, adhesiveness of the particles to the inner wall surface of the processing container is further increased. When the adhesion of the particles to the inner wall surface of the processing container occurs, a yield of a granulated or coated product maybe reduced. Further, the particles adhering to the inner wall surface of the processing container form a lump and fall into the processing container, with the result that a product quality may be degraded.

However, in Patent Literatures 1 and 3, the problem of adhesion of the particles to the inner wall surface of the processing container is not considered. Further, in Patent Literature 2, the dried powder adhering to the inner surface of the conical portion of the spray drying section is blown off by the air stream introduced from the air stream introducing part, and is prevented from adhering to and accumulating on the inner surface of the conical portion. However, it is difficult to eliminate adhesion of highly adhesive particles only by blowing the air stream toward the particles. Similarly, in Patent Literature 4, the powder adhering to the inner wall surface of the granulation chamber can be blown away by jetting the gas from the nozzles, but it is difficult to eliminate adhesion of highly adhesive particles only by jetting the gas.

It is an object of the invention of the subject application to provide a configuration capable of effectively blowing away particles adhering to an inner surface of a processing container in an apparatus configured to continuously manufacture granulated or coated particles, thereby improving a yield and quality of a product powder particle.

Solution to Problem

In order to solve the problem described above, according to one embodiment of the present invention, there is provided a continuous particle manufacturing apparatus, which includes a processing container, a processing gas introducing section configured to introduce a processing gas into the processing container, and a spray nozzle arranged in the processing container and configured to spray one processing solution selected from a raw material solution containing raw material powder, a binder solution, and a coating solution, and is configured to perform granulation process or coating process in such a manner that dried particles of the raw material powder produced continuously or intermittently by drying the raw material solution sprayed from the spray nozzle in the processing container, or particles of the raw material powder loaded continuously or intermittently into the processing container are brought into contact with the processing solution sprayed from the spray nozzle while the dried particles of the raw material powder or the particles of the raw material powder are fluidized by the processing gas, and then to discharge processed particles that undergo the granulation process or the coating process, the continuous particle manufacturing apparatus comprising: a particle drawing section configured to draw the particles out of the processing container; a sorting section configured to sort the particles drawn by the particle drawing section into the processed particles and unprocessed particles; a discharge section to which the processed particles sorted out by the sorting section are discharged; and a particle returning section configured to return, into the processing container, the unprocessed particles sorted out by the sorting section, the particle returning section being configured to blow the unprocessed particles toward an inner wall surface of the processing container together with an air stream.

In the configuration described above, the particle returning section may comprise an ejection nozzle configured to eject an air stream containing the unprocessed particles toward the inner wall surface of the processing container in a tangential direction or in an up-and-down direction of the processing container.

In the configuration described above, the particle drawing section may comprise a suction nozzle configured to draw the particles in the processing container by sucking the particles.

In the configuration described above, the sorting section may comprise a classification mechanism configured to sort the particles drawn by the particle drawing section into the processed particles and the unprocessed particles by a classification air stream.

In the configuration described above, the classification mechanism may be connected to the particle drawing section and the particle returning section through a cyclone mechanism.

Advantageous Effects of Invention

According to the present invention, in the apparatus configured to continuously manufacture the granulated or coated particles, the particles adhering to the inner surface of the processing container can effectively be blown away. With this configuration, the yield and quality of the product powder particle can be improved.

BRIEF DESCRIPTION OF DRAWINGS

FIG. 2(*b*) is a side view for illustrating a suction nozzle and an ejection nozzle.

FIG. 8(*b*) is an enlarged sectional view for illustrating a peripheral portion of one of the gas jet nozzles.

FIG. 9(*b*) is a view for illustrating the impeller as seen from an upper side thereof.

FIG. 9(*c*) is a sectional view for illustrating one of the agitation blades taken along the line c-c of FIG. 9(*b*).

FIG. 10(*b*) is a view for illustrating the processing container as seen from an upper side thereof.

DESCRIPTION OF EMBODIMENTS

Now, embodiments of the present invention are described with reference to the drawings.

Figure 1:
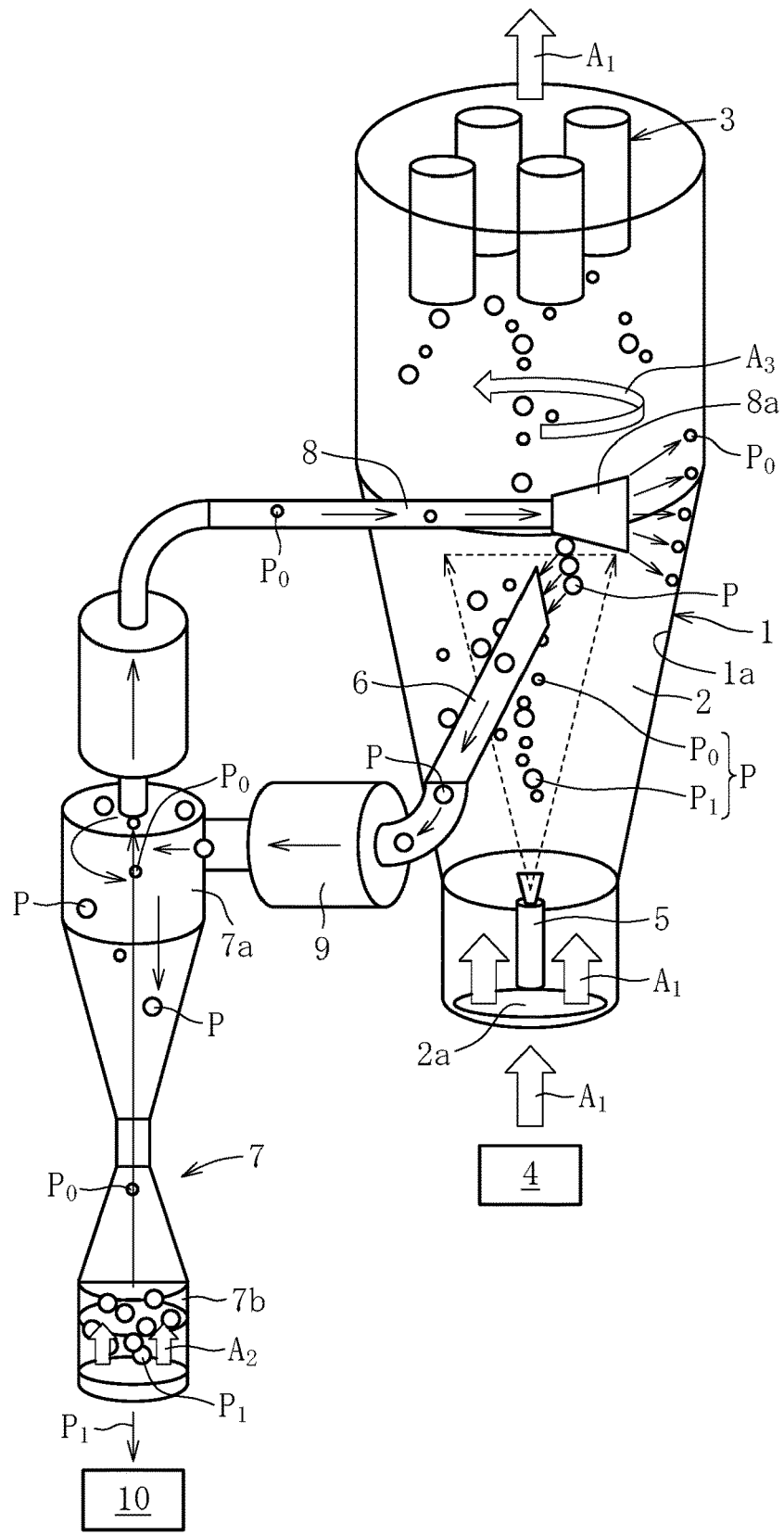
FIG. 1 is a view for conceptually illustrating a continuous particle manufacturing apparatus according to a first embodiment of the present invention.

FIG. 1 is a view for conceptually illustrating one configuration example of a continuous particle manufacturing apparatus according to a first embodiment of the present invention.

The continuous particle manufacturing apparatus according to the first embodiment comprises a fluidized bed apparatus as a main component. A processing container 1 of the fluidized bed apparatus comprises a processing chamber 2 in which granulation process or coating process of powder particles is performed, a filter section 3 configured to separate a solid and a gas from each other and arranged above the processing chamber 2, and an exhaust gas chamber (not shown) provided above the filter section 3.

A gas dispersion plate 2*a* formed of a porous plate (or a wire gauze) such as a punched metal is arranged at a bottom of the processing chamber 2. A processing gas A1 such as hot air supplied from a gas introducing section 4 is introduced into the processing container 1 through the gas dispersion plate 2*a*. Further, a spray nozzle 5 configured to spray a processing solution (raw material solution, binder solution, or coating solution) upward is installed at the bottom of the processing chamber 2. In the first embodiment, the spray nozzle 5 sprays the raw material solution obtained by dispersing or dissolving raw material powder in the binder solution or the coating solution. Further, the fluidized bed apparatus may be a so-called rolling fluidized bed apparatus in which a rotary disk (rolling plate) is arranged above the gas dispersion plate 2*a* with a predetermined gap.

In an interior of the processing container 1, a particle drawing section, namely, a suction nozzle 6 in the first embodiment, and a particle returning section, namely, an ejection nozzle 8 in the first embodiment are installed. The particle drawing section is configured to draw particles P of the powder particles out of the processing container 1, and the particle returning section is configured to blow unprocessed particles P0, which are sorted out by a sorting section 7 to be described later, toward an inner wall surface 1*a* of the processing container 1 together with an air stream. Outside the processing container 1, the suction nozzle 6 is connected to a cyclone mechanism 7*a* of the sorting section 7, which is described later, through a suction unit, for example, a suction ejector 9. Further, the ejection nozzle 8 is connected to the cyclone mechanism 7*a* outside the processing container 1.

The sorting section 7 comprises the cyclone mechanism 7*a* on an upper side, and a classification mechanism 7*b* on a lower side. In the cyclone mechanism 7*a*, the particles P (the unprocessed particles P0 and processed particles P1), which are sucked by the suction nozzle 6 and drawn out of the processing container 1 together with a suction air stream (suction air), are swirled and reduced in flow velocity, and are caused to descend by own weight. Thus, the particles P are fed to the classification mechanism 7*b*. The particles P descending from the cyclone mechanism 7*a* to the classification mechanism 7*b* often comprise mixture of the unprocessed particles P0 and the processed particles P1. However, depending on performance of the cyclone mechanism 7*a*, the cyclone mechanism 7*a* can sort the unprocessed particles P0 and the processed particles P1 from each other.

In the first embodiment, the classification mechanism 7*b* sorts the unprocessed particles P0 and the processed particles P1 from each other using a classification air stream (classification air) A2 that blows upward. The processed particles P1 sorted out by the classification mechanism 7*b* are discharged from the classification mechanism 7*b* to a discharge section 10 arranged below the classification mechanism 7*b*. Further, the unprocessed particles P0 sorted out by the classification mechanism 7*b* are fed to the ejection nozzle 8 by the classification air stream A2, or by a mixed air stream formed of the classification air stream A2 and the suction air stream flowing from the suction nozzle 6, and are ejected from the ejection nozzle 8 toward the inner wall surface 1*a* of the processing container 1 together with the air stream.

Figure 2A:
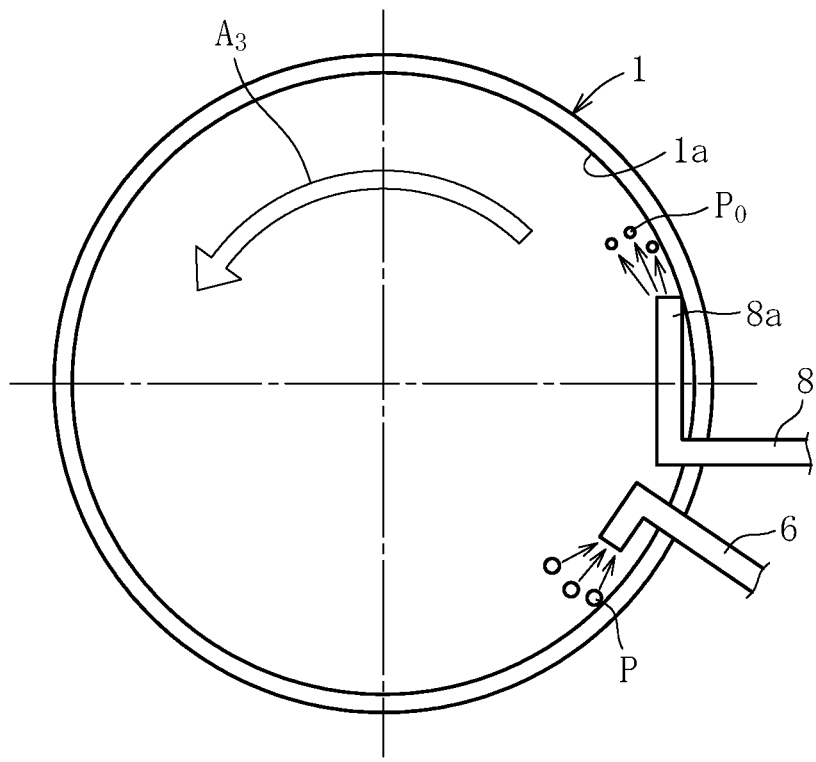
FIG. 2(*a*) is a view for illustrating an interior of a processing container as seen from an upper side thereof.
Figure 2B:
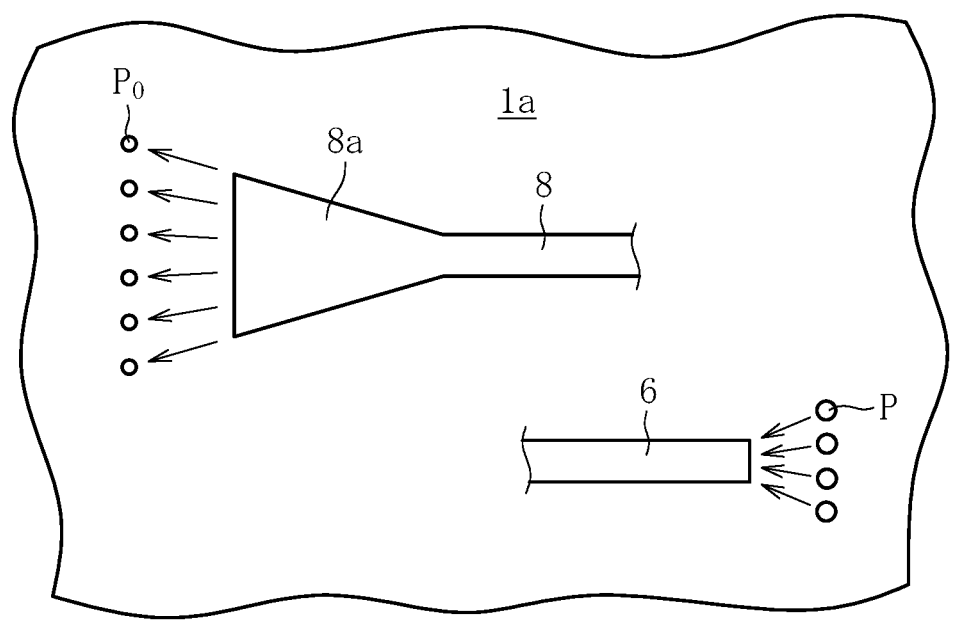

As schematically illustrated in FIG. 2, a form and an installation state of the suction nozzle 6 are set so that the suction nozzle 6 generates the suction air stream in a tangential direction of the processing container 1 so as to suck the particles P in the processing container 1. Further, a form and an installation state of the ejection nozzle 8 are set so that the ejection nozzle 8 blows the unprocessed particles P0 toward the inner wall surface 1*a* of the processing container 1 in the tangential direction together with the air stream. In order to enhance an effect of blowing the particles toward the inner wall surface 1*a* of the processing container 1, an ejection portion 8*a* of the ejection nozzle 8 is preferably formed into a shape flattened in a direction orthogonal to the inner wall surface 1*a*. Further, an ejection portion of the suction nozzle 6 may be formed into a similar shape to enhance an effect of sucking the particles P.

The raw material solution sprayed upward from the spray nozzle 5 installed at the bottom of the processing container 1 is dried by the processing gas A1 introduced into the processing container 1, and the raw material powder dispersed or dissolved in the raw material solution is agglomerated into dried particles. While the dried particles are fluidized in the processing container 1, the processing gas A1 introduced into the processing container 1 brings the dried particles into contact with liquid droplets of the raw material solution sprayed from the spray nozzle 5. The liquid droplets of the raw material solution adhering to the dried particles are dried by the processing gas A1, and particles of the raw material powder in the liquid droplets adhere to the dried particle serving as a nucleus. In this manner, a particle diameter of the dried particles is increased. While the dried particles are fluidized in the processing container 1, the processing gas A1 introduced into the processing container 1 further brings the dried particles into contact with liquid droplets of the raw material solution sprayed from the spray nozzle 5. Thus, the particle diameter is further increased. Through repetition of the above-mentioned step of agglomerating a particle, the processed particles P1 (granulated product) having a predetermined particle diameter (or weight) is produced (so-called layering granulation). In the processing step, the raw material powder may be sprinkled in the processing container 1.

In the above-mentioned step of granulation process or coating process, the unprocessed particles P0 (each containing a raw material particle serving as the nucleus) that do not attain to the predetermined particle diameter (or weight), and the processed particles P1 that attain to the predetermined particle diameter (or weight) are mixed in the processing container 1. Then, the unprocessed particles P0 and the processed particles P1 are sorted from each other. The processed particles P1 are discharged as product particles, whereas the unprocessed particles P0 are successively subjected to the granulation process or the coating process to be finished into the processed particles P1.

The particles P in the processing container 1, in which the unprocessed particles P0 and the processed particles P1 are mixed, are sucked by the suction air stream generated by the suction nozzle 6, and then are transferred to the cyclone mechanism 7*a* of the sorting section 7. The particles P transferred to the cyclone mechanism 7*a* are reduced in flow velocity while swirling in the cyclone mechanism 7*a*, and descend by own weight. Thus, the particles P are fed to the classification mechanism 7*b*. The particles P fed to the classification mechanism 7*b* are sorted into the unprocessed particles P0 and the processed particles P1 by the classification air stream A2 that blows upward. The processed particles P1 descend by own weight against the classification air stream A2, and are discharged to the discharge section 10. Further, the unprocessed particles P0 are blown upward by the classification air stream A2, and are returned to the cyclone mechanism 7*a*. When there are the unprocessed particles P0 that do not descend from the cyclone mechanism 7*a*, the unprocessed particles P0 are transferred to the ejection nozzle 8 together with the particles by the classification air stream A2, or by the mixed air stream formed of the classification air stream A2 and the suction air stream flowing from the suction nozzle 6. Then, the unprocessed particles P0 transferred to the ejection nozzle 8 are carried to the ejection portion 8*a* by the classification air stream A2 flowing in the ejection nozzle 8, or by the mixed air stream formed of the classification air stream A2 and the suction air stream flowing from the suction nozzle 6, and are blown toward the inner wall surface 1*a* of the processing container 1 together with the air stream flowing from the ejection portion 8*a*. The air stream and the unprocessed particles P0 thus blown toward the inner wall surface 1*a* of the processing container 1 in the tangential direction effectively blow away powder particles adhering to the inner wall surface 1*a* of the processing container 1. In this manner, the powder particles are returned to a fluidized bed in the processing container 1. Further, after exerting the above-mentioned blow-away action, the unprocessed particles P0 ejected from the ejection nozzle 8 into the processing container 1 are returned to the fluidized bed in the processing container 1 to be subjected to the granulation process or the coating process. In order to further enhance the blow-away effect by increasing the flow velocity of the air stream and the unprocessed particles P0 ejected from the ejection portion 8*a* of the ejection nozzle 8, a suction unit, for example, a suction ejector configured to generate a suction force to the ejection portion 8*a* side, or an air stream supplying unit configured to supply an air stream toward the ejection portion 8a may be provided at a part of the ejection nozzle 8 or at a connection portion between the ejection nozzle 8 and the cyclone mechanism 7a.

When a flow rate of the above-mentioned classification air stream A2 is adjustable by a pressure reducing device (for example, adjustable from 0 MPa to 0.5 MPa) or by a flow rate adjusting valve (for example, adjustable from 0 L/min to 1000 L/min), a particle size (particle diameter) to be sorted out can be adjusted as appropriate. Alternatively, when a classification time period is adjusted as appropriate (for example, adjusted from 0 hours to 1 hour) in such a manner that a time period for introducing the above-mentioned classification air stream A2 into the classification mechanism 7b is controlled manually or controlled by a timer device, accuracy of the particle size (particle diameter) to be sorted out can be adjusted as appropriate.

As illustrated in FIG. 2, in the first embodiment, the suction nozzle 6 is configured to suck the particles P in the processing container 1 along the tangential direction of the processing container 1, and the ejection nozzle 8 is configured to blow the unprocessed particles P0 toward the inner wall surface 1a of the processing container 1 in the tangential direction together with the air stream. In addition, the suction force (suction air stream) generated by the suction nozzle 6, and an ejection force (ejection air stream) generated by the ejection nozzle 8 act in the same peripheral direction. Accordingly, in the processing container 1, the suction force (suction air stream) of the suction nozzle 6 and the ejection force (ejection air stream) of the ejection nozzle 8 generate a swirl air stream A3 flowing in a direction indicated in FIG. 2(a). The swirl air stream A3 disperses the particles P in the processing container 1, thereby preventing formation of coarse particles caused by adhesion and aggregation of particles. Further, the swirl air stream A3 accelerates motion of the particles. Thus, the particles are prevented from adhering to the inner wall surface 1a of the processing container 1.

The above-mentioned processing operation is performed continuously or intermittently. With this operation, the processed particles P1 (product particles) are continuously manufactured from the raw material solution. According to the continuous particle manufacturing apparatus of the first embodiment, product fine particles having a small particle diameter, for example, fine particles having a particle diameter of 100 μm or less can be continuously manufactured with good yield.

Figure 3:
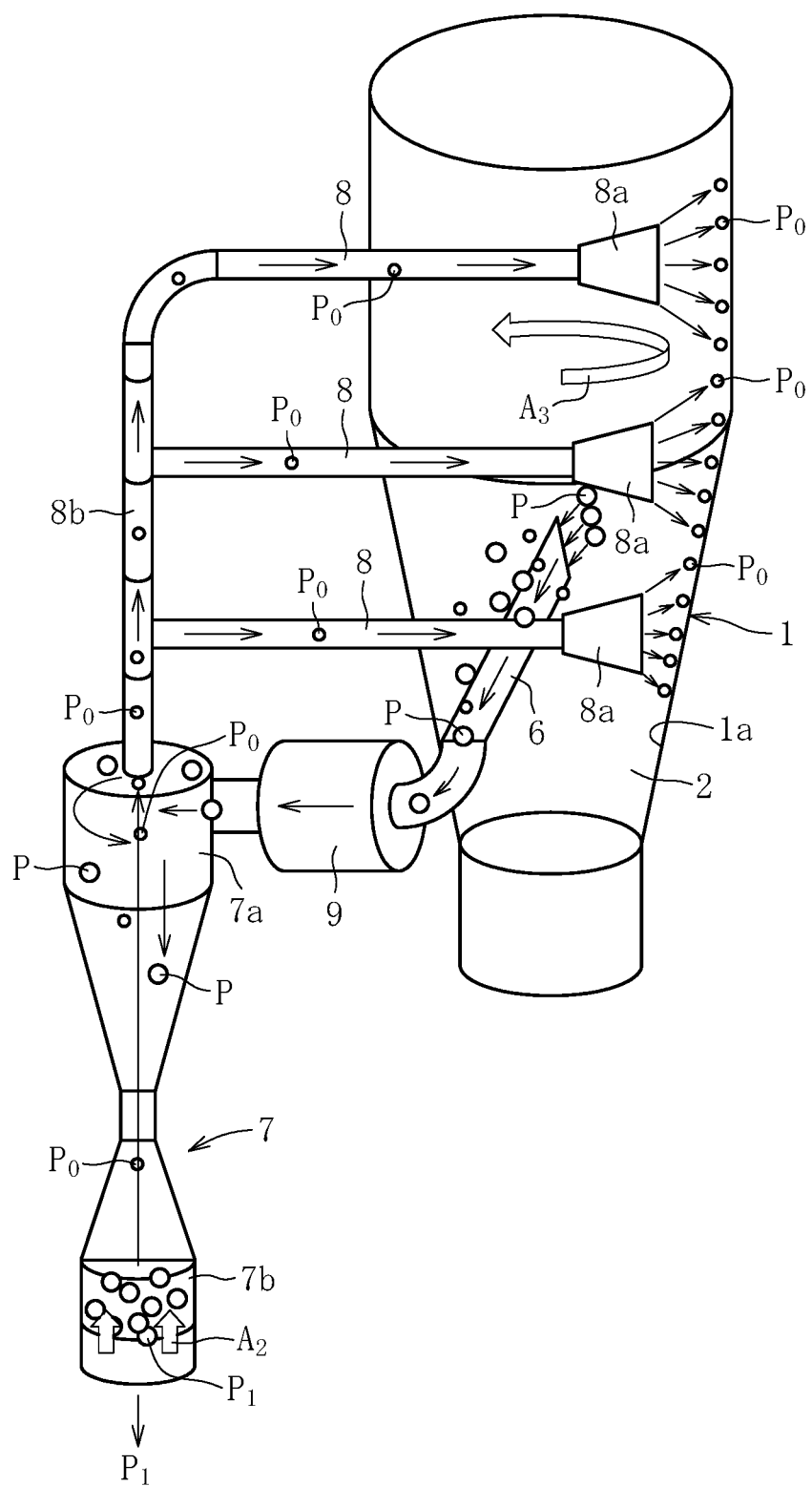
FIG. 3 is a view for conceptually illustrating a continuous particle manufacturing apparatus according to a second embodiment of the present invention.

FIG. 3 is a view for conceptually illustrating a continuous particle manufacturing apparatus according to a second embodiment of the present invention. The continuous particle manufacturing apparatus according to the second embodiment is substantially different from the continuous particle manufacturing apparatus according to the first embodiment in that a plurality of (three in the example illustrated in FIG. 3) ejection nozzles 8 are installed. In the example illustrated in FIG. 3, the ejection nozzles 8 are branched from a common portion 8b, and the ejection portions 8a of the ejection nozzles 8 are arrayed along an up-and-down direction of the processing container 1. However, the ejection nozzles 8 may be configured such that the ejection portions 8a of the ejection nozzles 8 are installed at different positions along a circumferential direction of the processing container 1. Further, at least one of the ejection nozzles 8 maybe independently connected to the cyclone mechanism 7a of the sorting section 7. The other matters apply correspondingly to the first embodiment, and hence redundant description is omitted.

Figure 4:
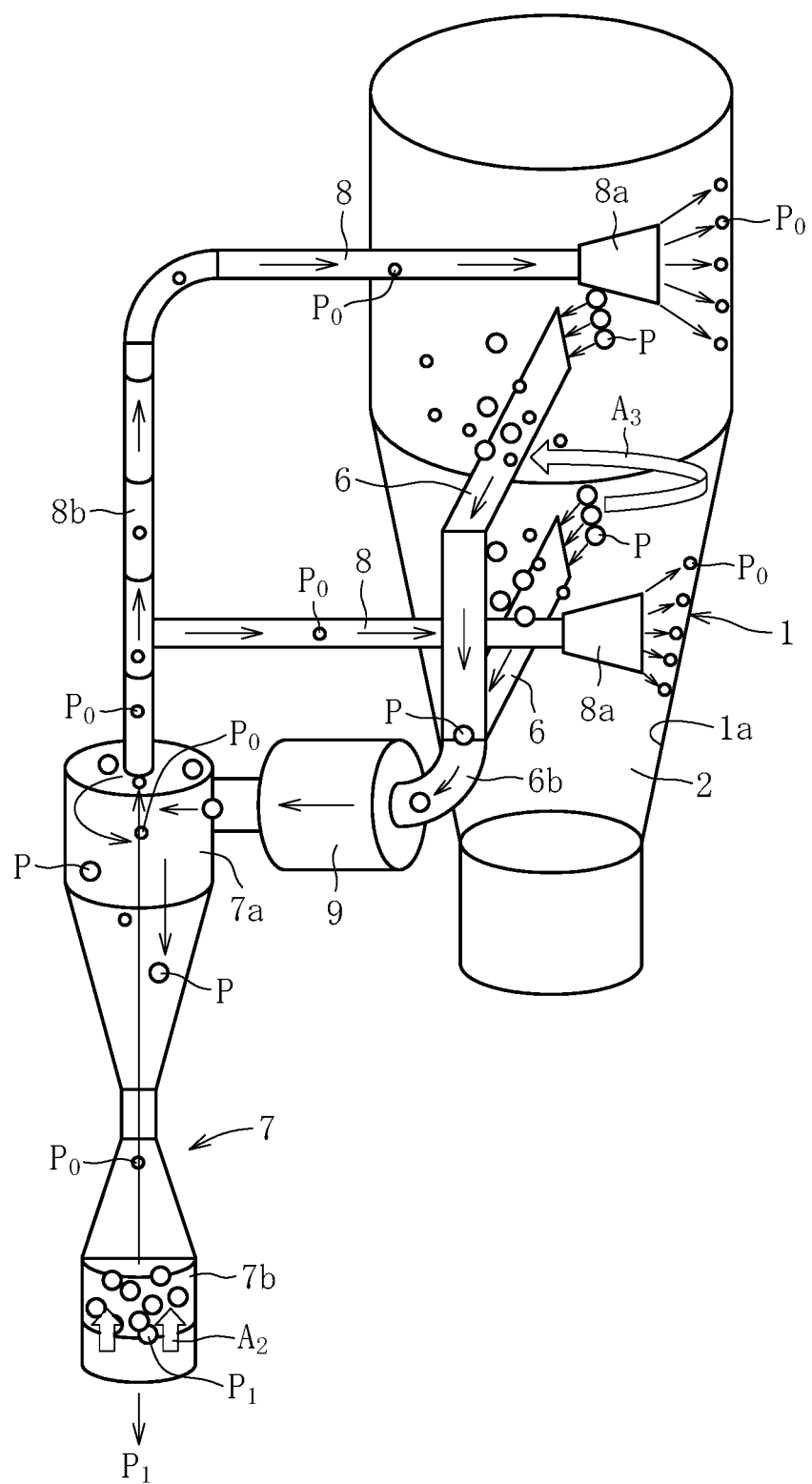
FIG. 4 is a view for conceptually illustrating a continuous particle manufacturing apparatus according to a third embodiment of the present invention.

FIG. 4 is a view for conceptually illustrating a continuous particle manufacturing apparatus according to a third embodiment of the present invention. The continuous particle manufacturing apparatus according to the third embodiment is substantially different from the continuous particle manufacturing apparatus according to the first embodiment and the second embodiment in that a plurality of (two in the example illustrated in FIG. 4) suction nozzles 6 are installed. In the example illustrated in FIG. 4, the respective suction nozzles 6 are branched from a common portion 6b. However, at least one of the suction nozzles 6 may be independently connected to the cyclone mechanism 7a of the sorting section 7 through intermediation of the ejector 9. The other matters apply correspondingly to the first embodiment and the second embodiment, and hence redundant description is omitted.

Figure 5:
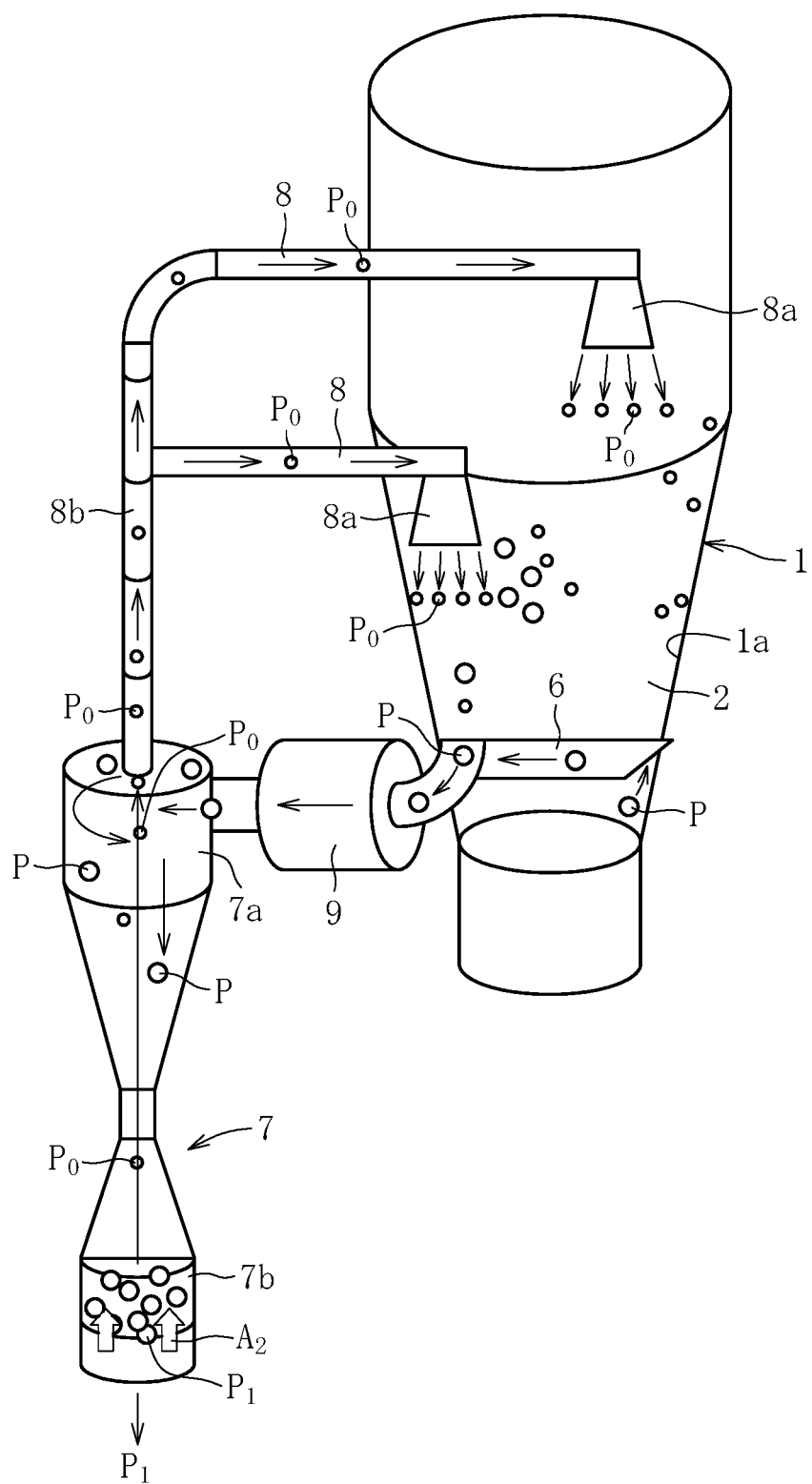
FIG. 5 is a view for conceptually illustrating a continuous particle manufacturing apparatus according to a fourth embodiment of the present invention.

FIG. 5 is a view for conceptually illustrating a continuous particle manufacturing apparatus according to a fourth embodiment of the present invention. The continuous particle manufacturing apparatus according to the fourth embodiment is substantially different from the continuous particle manufacturing apparatus according to the first embodiment and the second embodiment in that the ejection portions 8a of the ejection nozzles 8 are installed to face downward, and that the unprocessed particles P0 are blown downward from the ejection nozzles 8 toward the inner wall surface 1a of the processing container 1 together with the air stream. The configuration according to the fourth embodiment is effective particularly when a so-called Wurster type fluidized bed apparatus is used as the fluidized bed apparatus. That is, in the Wurster type fluidized bed apparatus, a draft tube (inner tube) is installed above a spray nozzle, and a spray stream (spray zone) of the processing solution to be sprayed upward from the spray nozzle is guided upward by the draft tube. The particles, which are carried by the spray stream of the processing solution to ascend in the draft tube, are jetted from an upper portion of the draft tube, and then are reduced in flow velocity to descend along the inner wall surface 1a of the processing container 1. The unprocessed particles P0 are blown downward from the ejection nozzles 8 toward the inner wall surface 1a of the processing container 1 together with the air stream. This configuration accelerates motion of the particles descending along the inner wall surface 1a of the processing container 1, and thus prevents the particles from adhering to the inner wall surface 1a. The other matters apply correspondingly to the first embodiment and the second embodiment, and hence redundant description is omitted.

Figure 6:
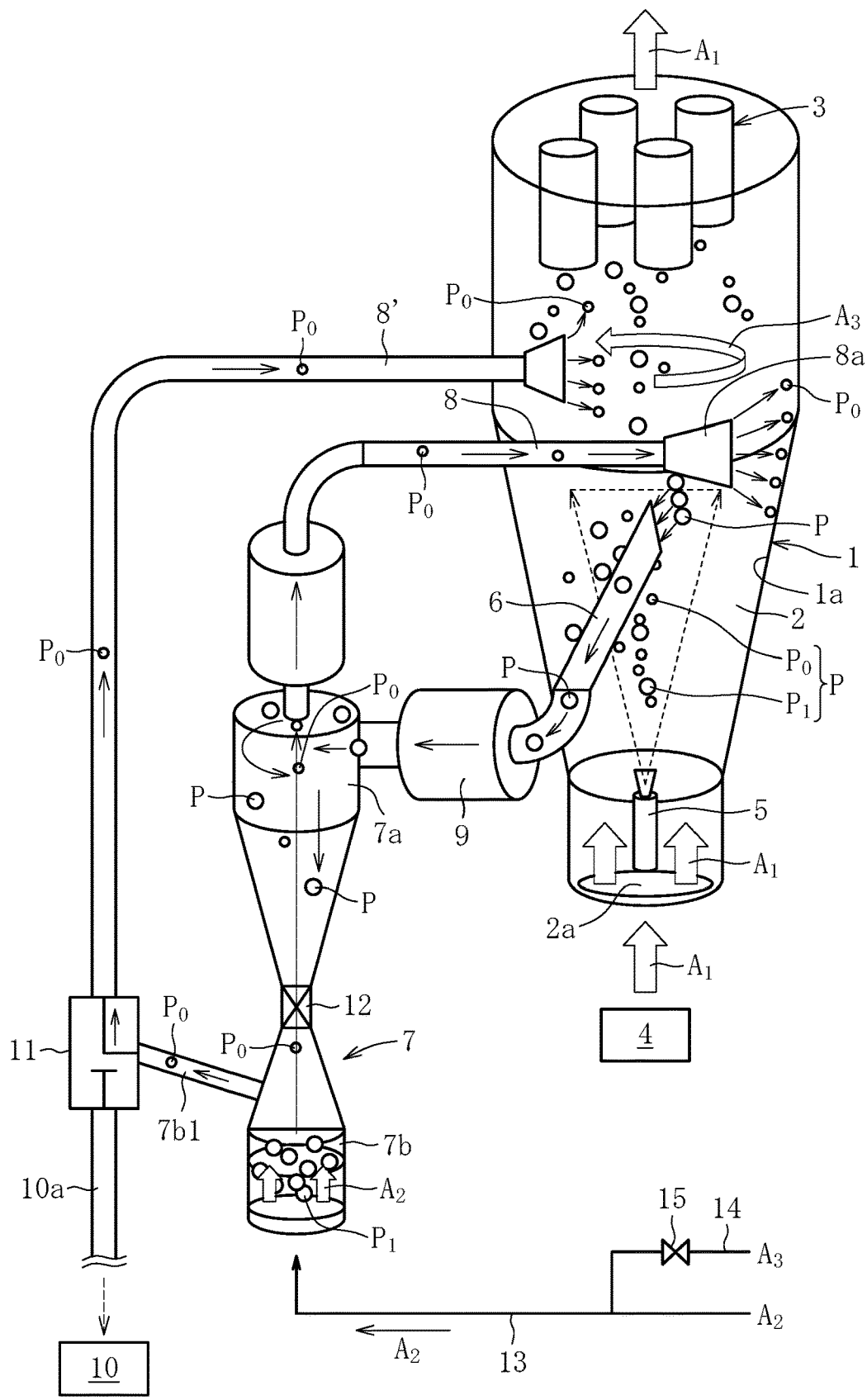
FIG. 6 is a view for conceptually illustrating a continuous particle manufacturing apparatus according to a fifth embodiment of the present invention.
Figure 7:
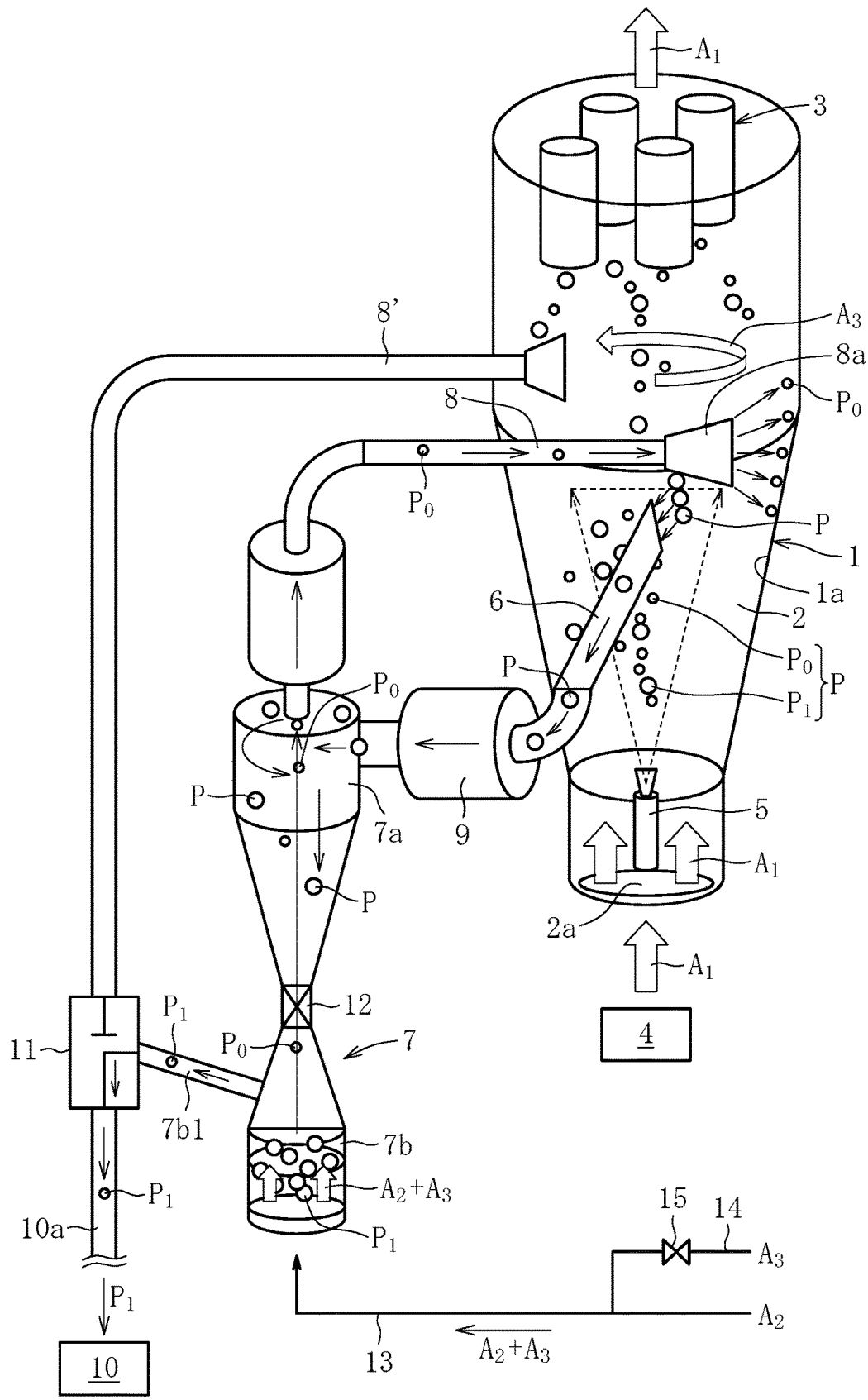
FIG. 7 is a view for conceptually illustrating the continuous particle manufacturing apparatus according to the fifth embodiment.

FIG. 6 and FIG. 7 are views for conceptually illustrating a continuous particle manufacturing apparatus according to a fifth embodiment of the present invention. In the fifth embodiment, a bypass passage 7b1 is connected to an upper portion of the classification mechanism 7b of the sorting section 7, and the bypass passage 7b1 is connected through a switching valve, such as a three-way switching valve 11, to a second ejection nozzle 8' and a discharge passage 10a linked to the discharge section 10. Through an electromagnetic force, pneumatic pressure, hydraulic pressure, or manual operation, communication among the bypass passage 7b1, the second ejection nozzle 8', and the discharge passage 10a can be switched by the three-way switching valve 11 among a state in which mutual communication among the bypass passage 7b1, the second ejection nozzle 8', and the discharge passage 10a is interrupted, a state in which communication between the bypass passage 7b1 and the second ejection nozzle 8' is allowed, and a state in which communication between the bypass passage 7b1 and the discharge passage 10a is allowed. Further, an on-off valve 12 is interposed between the cyclone mechanism 7a and the classification mechanism 7b of the sorting section 7. The structure and a function of the second ejection nozzle 8' being the particle returning section are the same as or equivalent to those of the above-mentioned ejection nozzle 8. However, instead of the second ejection nozzle 8', a member like a mere connection pipe maybe used. The classification mechanism 7b has the structure enabling the classification air stream (classification air) A2 and the like to be introduced into the classification mechanism 7b from below, and enabling the particles to remain in the classification mechanism 7b. For example, a lower portion of the classification mechanism 7b is formed of a meshed plate in which a large number of vent holes having a predetermined hole diameter are formed. The lower portion of the classification mechanism 7b has the structure allowing the classification air stream A2 and the like to flow into the classification mechanism 7b through the meshed plate, but preventing the particles from passing through the meshed plate. The classification air stream A2 is introduced into the classification mechanism 7b through a main duct 13. Further, in the fifth embodiment, an auxiliary duct 14 is branched from and connected to the main duct 13 through a release valve 15. An auxiliary air stream A3 is supplied into the auxiliary duct 14.

Under the state illustrated in FIG. 6, the three-way switching valve 11 allows communication between the bypass passage 7b1 and the second ejection nozzle 8', but interrupts communication between the bypass passage 7b1 and the discharge passage 10a. The on-off valve 12 is opened, and the cyclone mechanism 7a and the classification mechanism 7b are communicated to each other. Further, the release valve 15 is closed, and only the classification air stream A2 is introduced into the classification mechanism 7b. The particles P, which are sucked by the suction nozzle 6 and then fed from the cyclone mechanism 7a to the classification mechanism 7b of the sorting section 7, are sorted into the unprocessed particles P0 and the processed particles P1 by the classification air stream A2 that blows upward. The processed particles P1 descend by own weight against the classification air stream A2, and remain in the lower portion of the classification mechanism 7b. Meanwhile, the unprocessed particles P0 are carried and blown upward by the classification air stream A2. Apart of the unprocessed particles P0 is transferred from the bypass passage 7b1 through the three-way switching valve 11 to the second ejection nozzle 8', whereas the remaining part thereof is transferred to the ejection nozzle 8 via the cyclone mechanism 7a.

During sorting operation of the particles P in the sorting section 7, the particles P descending through the cyclone mechanism 7a are overpowered by a force of the classification air stream A2 blowing upward from below the classification mechanism 7b, with the result that the particles P may flow into the ejection nozzle 8 as they are without descending into the classification mechanism 7b. In order to prevent this, it is necessary to temporarily weaken or stop the classification air stream A2, but this leads to complicated operation. Further, when the classification air stream A2 is stopped even temporarily, the meshed plate of the classification mechanism 7b maybe clogged. In contrast, in the continuous particle manufacturing apparatus according to the fifth embodiment, as described above, the classification air stream A2 and the part of the unprocessed particles P0 carried by the classification air stream A2 are transferred (released) from the bypass passage 7b1 through the three-way switching valve 11 to the second ejection nozzle 8'. Accordingly, the particles P descending through the cyclone mechanism 7a are smoothly transferred to the classification mechanism 7b, with the result that the classification mechanism 7b effectively performs the sorting operation (classification operation).

When a certain amount of the processed particles P1 remains in the lower portion of the classification mechanism 7b after repetition of a series of circulating cycles of drawing the particles P out of the processing container 1 by the suction nozzle 6, sorting the particles P by the sorting section 7, and returning the particles P (P0) to the processing container 1 by the ejection nozzle 8 and the second ejection nozzle 8', as illustrated in FIG. 7, through switching performed by the three-way switching valve 11, communication between the bypass passage 7b1 and the second ejection nozzle 8' is interrupted, but the bypass passage 7b1 and the discharge passage 10a are communicated to each other. Further, the on-off valve 12 is closed, and communication between the cyclone mechanism 7a and the classification mechanism 7b is interrupted. In addition, the release valve 15 on the auxiliary duct 14 is opened, and the auxiliary air stream A3 is supplied from the auxiliary duct 14 to the main duct 13. In this manner, a strong air stream (air stream stronger than the classification air stream A2) obtained by adding the auxiliary air stream A3 to the classification air stream A2 is introduced from the main duct 13 into the classification mechanism 7b, with the result that the processed particles P1 that remain in the lower portion of the classification mechanism 7b are effectively discharged from the classification mechanism 7b to the discharge section 10 via the bypass passage 7b1, the three-way switching valve 11, and the discharge passage 10a.

Instead of the three-way switching valve 11, there may be used a two-way switching valve configured to switch communication of the bypass passage 7b1 to the second ejection nozzle 8' and the discharge passage 10a between a state in which the bypass passage 7b1 and the second ejection nozzle 8' are communicated to each other, and a state in which the bypass passage 7b1 and the discharge passage 10a are communicated to each other.

In the above-mentioned embodiments, as illustrated in FIG. 8, a gas jet nozzle 21 may be installed on a wall portion of the processing container 1. In an embodiment illustrated in FIG. 8, a plurality of, for example, three gas jet nozzles 21 are installed at positions of the processing container 1 at a predetermined height along the circumferential direction. The above-mentioned positions at the predetermined height of installing the gas jet nozzles 21 may be positions arrayed at the same height, or positions spaced at a plurality of heights in the up-and-down direction.

Figure 8A:
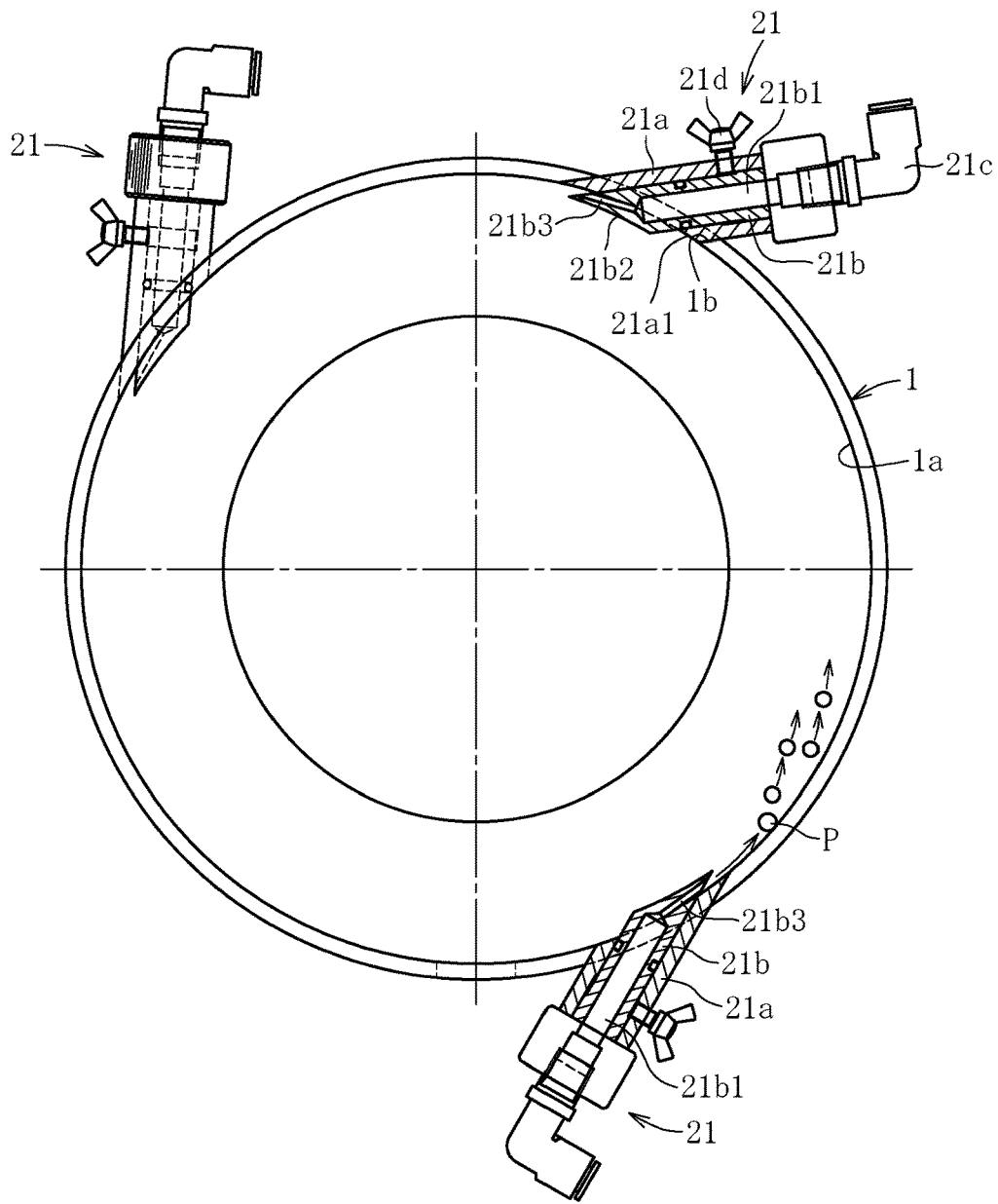
FIG. 8(*a*) is a transverse sectional view for illustrating a processing container in an embodiment of installing gas jet nozzles on a wall portion of the processing container.
Figure 8B:
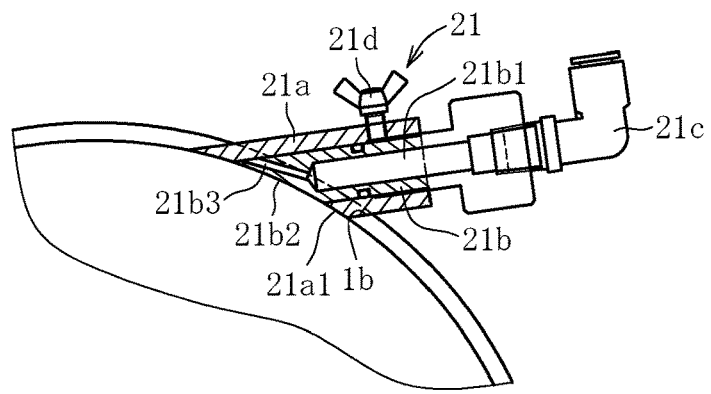

Each of the gas jet nozzles 21 comprises, as main components, a support tube 21a mounted in an installation hole 1b formed in the wall portion of the processing container 1, and a nozzle tube 21b inserted in the support tube 21a so as to be able to advance and retreat. The support tube 21a is fixed to the installation hole 1b by appropriate means such as welding, and a distal end surface 21a1 of the support tube 21a is flush with the inner wall surface 1a of the processing container 1. The nozzle tube 21b has a gas path 21b1, and a nozzle hole 21b3 formed to be communicated to the gas path 21b1 and opened sideways at the vicinity of a distal end surface 21b2. The gas path 21b1 is connected to a gas supply port 21c. A gas pipe, which is linked to a gas supply source such as a compressed air source (not shown), is connected to the gas supply port 21c. In a transverse section (horizontal section) of the processing container 1, the nozzle hole 21b3 is inclined in a predetermined direction with respect to the gas path 21b1 to be directed to one circumferential direction along the inner wall surface 1a of the processing container 1. The distal end surface 21b2 of the nozzle tube 21b has a curvature conforming to the inner wall surface 1a of the processing container 1. As illustrated in FIG. 8(b), when the nozzle tube 21b is retained in the support tube 21a at a retreat position, the distal end surface 21b2 is flush with the distal end surface 21a1 of the support tube 21a and the inner wall surface 1a of the processing container 1. Further, when the nozzle tube 21b is retained at the retreat position, a distal end opening of the nozzle hole 21b3 is closed by an inner wall surface of the support tube 21a.

The nozzle tube 21b is retained in the support tube 21a with a set screw 21d that is passed through a wall portion of the support tube 21a to be threadedly engaged with and connected to the support tube 21a. When the set screw 21d is loosened from the state illustrated in FIG. 8(b) and then the nozzle tube 21b is caused to advance in the support tube 21a, as illustrated in FIG. 8(a), the distal end surface 21b2 of the nozzle tube 21b is slightly protruded from the distal end surface 21a1 of the support tube 21a to the interior side of the processing container 1, and a distal end of the nozzle hole 21b3 is opened at a position in the vicinity of the inner wall surface 1a of the processing container 1. At this position (advance position of the nozzle tube 21b), the set screw 21d is fastened to retain the nozzle tube 21b in the support tube 21a. When, under this state, a compressed gas (such as a compressed air) is supplied into the gas supply port 21c, the compressed gas flows through the gas path 21b1 into the nozzle hole 21b3 to be jetted from the distal end of the nozzle hole 21b3 into the processing container 1. As described above, the nozzle hole 21b3 is directed to the one circumferential direction along the inner wall surface 1a of the processing container 1, and the distal end of the nozzle hole 21b3 is opened at the position in the vicinity of the inner wall surface 1a of the processing container 1. Accordingly, the compressed gas jetted from the nozzle hole 21b3 generates a swirl stream flowing along the inner wall surface 1a of the processing container 1 in the circumferential direction (see the gas jet nozzle 21 on the lower side of FIG. 8(a)). The swirl stream generated by the compressed gas effectively blow away the powder particles P adhering to the inner wall surface 1a of the processing container 1 from the inner wall surface 1a. Thus, the powder particles P are returned into the fluidized bed in the processing container 1. Further, when the particles, which are moved in the processing container 1 while being carried by the above-mentioned swirl stream generated by the compressed gas, are brought into collision or contact with the inner wall surface 1a, the particles undergo compaction, and increase in sphericalness and weight of the particles are accelerated.

Figure 9A:
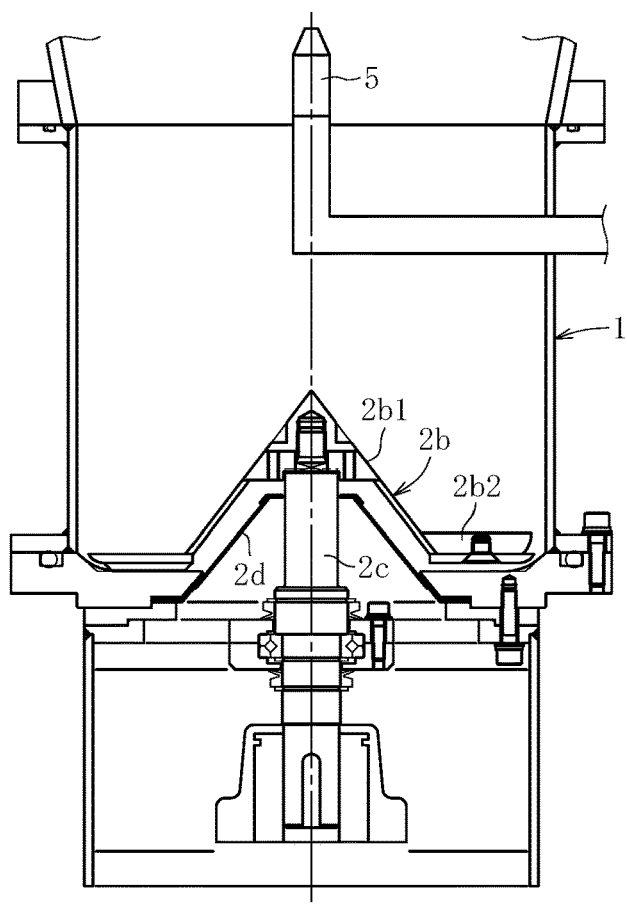
FIG. 9(*a*) is a vertical sectional view for illustrating a periphery of a bottom of a processing container in an embodiment of installing an impeller comprising agitation blades at the bottom of the processing container.
Figure 9C:
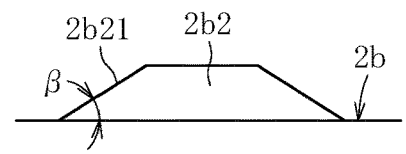
Figure 9B:
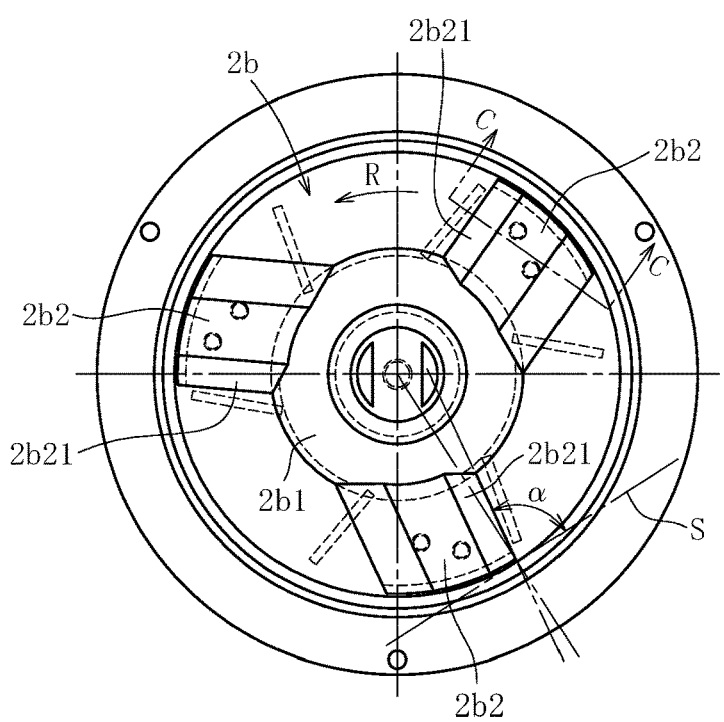

Further, in the above-mentioned embodiments, as illustrated in FIG. 9, an impeller comprising agitation blades, for example, an impeller 2b comprising a boss portion 2b1 and a plurality of (for example, three) agitation blades 2b2 may be installed at the bottom of the processing container 1. The impeller 2b is coupled to a rotation drive shaft 2c, and is rotated in a direction (R direction) indicated by the arrow of FIG. 9(b). The boss portion 2b1 has a substantially conical shape, and is positioned at a rotation center portion. The agitation blades 2b2 extend from an outer periphery of the boss portion 2b1 in an outer peripheral direction. Further, a meshed net 2d is installed below the impeller 2b. The processing gas such as the hot air supplied from the gas introducing section 4 (see FIG. 1) is introduced into the processing container 1 through the meshed net 2d, a gap between the bottom of the processing container 1 and a lower surface of the impeller 2b, and a gap between an inner periphery of the processing container 1 and an outer periphery of the impeller 2b.

As illustrated in FIG. 9(b) and FIG. 9(c), in the fifth embodiment, a rotating-direction leading surface 2b21 of each agitation blade 2b2 has predetermined inclination angles α and β. The inclination angle α is an angle formed by a lower edge of the rotating-direction leading surface 2b21 of the agitation blade 2b2 and a tangential line S at an outer-peripheral-side corner portion of the lower edge thereof. It is preferred that the inclination angle α be set to an angle of from 60° to 100°. Further, the inclination angle β is an angle formed by the rotating-direction leading surface 2b21 of the agitation blade 2b2 and an upper surface of the impeller 2b. It is preferred that the inclination angle β be set to an angle of from 25° to 45°.

Owing to installation of the impeller 2b comprising the agitation blades 2b2 at the bottom of the processing container 1, particularly, owing to setting of the inclination angles α and β of the rotating-direction leading surface 2b21 of each of the agitation blades 2b2 to the above-mentioned values, along with rotation of the impeller 2b, the particles P in the processing container 1 are moved along the inner wall surface 1a1 of the processing container 1 in a swirling direction. The movement of the particles P accelerates suction of the particles P performed by the suction nozzle 6 (see FIG. 1 and the like). Thus, the particles P are efficiently drawn out of the processing container 1. Then, the particles P are efficiently fed from the suction nozzle 6 (particle drawing section) to the sorting section 7, thereby increasing an effect of sorting (classifying) the particles P by the sorting section 7. As a result, a product yield (yield of particles having a desired particle diameter) is increased. Further, when the particles moved in the processing container 1 in the swirling direction are brought into collision or contact with the inner wall surface 1a, the particles undergo compaction, and increase in sphericalness and weight of the particles are accelerated.

Figure 10A:
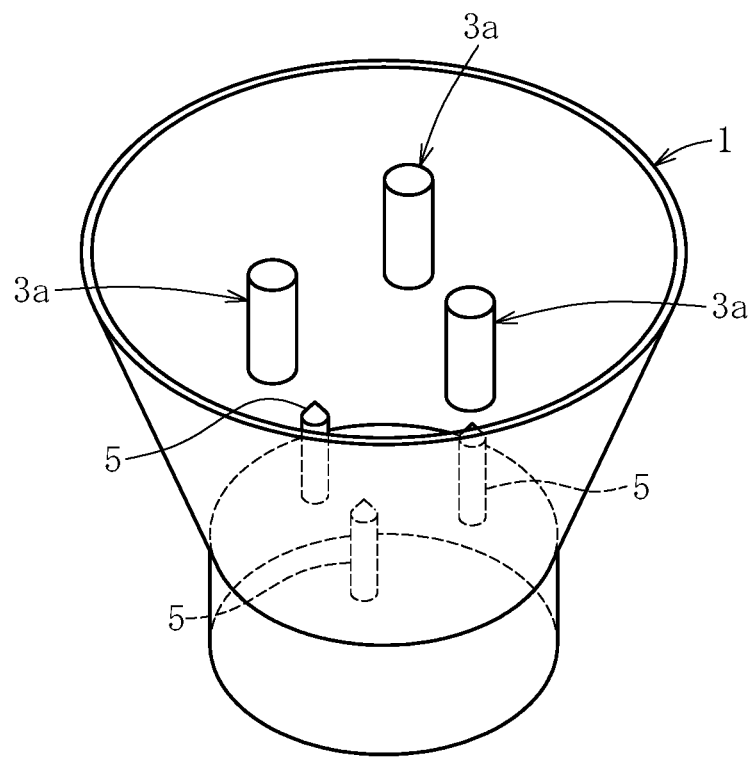
FIG. 10(*a*) is a perspective view for conceptually illustrating a processing container as seen from an obliquely upper side thereof in an embodiment of installing a plurality of spray nozzles at a bottom of the processing container.
Figure 10B:
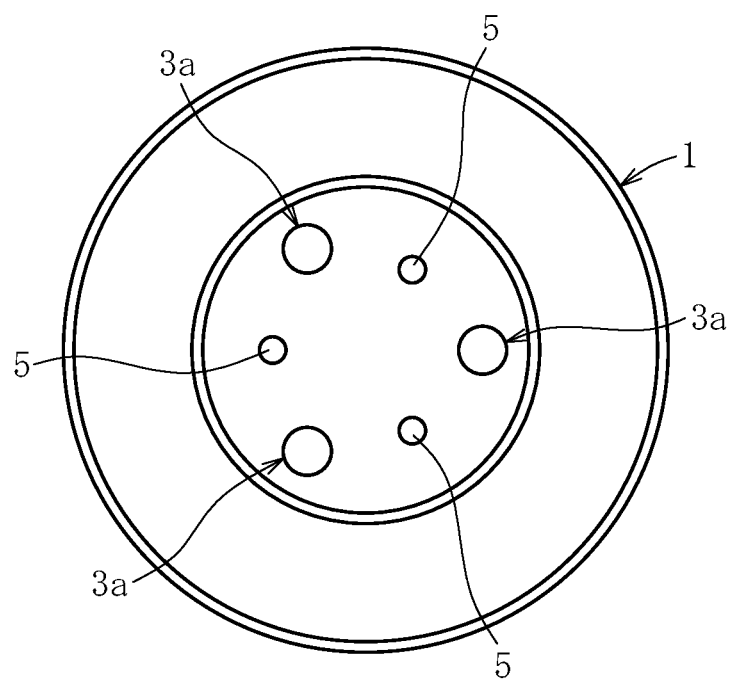

Further, in the above-mentioned embodiments, as schematically illustrated in FIG. 10, a plurality of (three in the example illustrated in FIG. 10) spray nozzles 5 configured to spray the processing solution upward may be installed at the bottom of the fluidized bed container 1. In this case, it is preferred that installation positions of the spray nozzles 5 be shifted from filters 3a of the filter section 3 in the circumferential direction. Owing to installation of the plurality of spray nozzles 5, simplification of a scale-up can be achieved. Further, when the installation positions of the spray nozzles 5 are shifted from the filters 3a of the filter section 3 in the circumferential direction, the processing solution sprayed from the spray nozzles 5 is prevented from adhering to the filters 3a and reducing function of the filters.

In the above-mentioned embodiments, a position of sucking the particles P in the processing container 1 by the suction nozzle 6 may be set to at least one position selected from a lower position, a middle position, an upper position of the fluidized bed of the particles P in the processing container 1, and a position above the fluidized bed of the particles P.

In the continuous particle manufacturing apparatus according to the above-mentioned embodiments, the processed particles P1 (product particles) are continuously manufactured by spraying the raw material solution from the spray nozzles 5 into the processing container 1. However, the processed particles P1 (product particles) maybe continuously manufactured by continuously or intermittently loading particles of the raw material powder into the processing container 1 and spraying the binder solution or the coating solution from the spray nozzles 5. In this case, each spray nozzle 5 may be configured to spray the binder solution or the coating solution in an upward direction, a downward direction, or the tangential direction. Alternatively, those spraying directions may be combined freely selectively.

Further, producing the dried particles of the raw material powder by spraying the raw material solution from the spray nozzles 5, drawing the particles by the suction nozzle 6, sorting the particles by the sorting section 7, and discharging the particles to the discharge section 10 may be performed continuously or intermittently.

REFERENCE SIGNS LIST 1 processing container
1a inner wall surface
4 gas introducing section
5 spray nozzle
6 suction nozzle
7 sorting section
7a cyclone mechanism
7b classification mechanism
7b1 bypass passage
8 ejection nozzle
8' second ejection nozzle
10 discharge section
10a discharge passage
11 three-way switching valve
12 on-off valve
21 gas jet nozzle
P particle
P0 unprocessed particle
P1 processed particle

The invention claimed is:

1. A continuous particle manufacturing apparatus, which includes a processing container, a processing gas introducing section configured to introduce a processing gas into the processing container, and a spray nozzle arranged in the processing container and configured to spray one processing solution selected from a raw material solution containing raw material powder, a binder solution, and a coating solution, and is configured to perform a granulation process or a coating process in such a manner that dried particles of the raw material powder produced continuously or intermittently by drying the raw material solution sprayed from the spray nozzle in the processing container, or particles of the raw material powder loaded continuously or intermittently into the processing container are brought into contact with the processing solution sprayed from the spray nozzle while the dried particles of the raw material powder or the particles of the raw material powder are fluidized by the processing gas, and then to continuously or intermittently discharge processed particles that undergo the granulation process or the coating process, the continuous particle manufacturing apparatus comprising:

a particle drawing section configured to draw the particles out of the processing container;

a sorting section configured to sort the particles drawn by the particle drawing section into the processed particles and unprocessed particles;

a discharge section to which the processed particles sorted out by the sorting section are discharged; and a particle returning section configured to return, into the processing container, the unprocessed particles sorted out by the sorting section, the particle returning section being configured to blow the unprocessed particles toward an inner wall surface of the processing container together with an air stream, wherein the particle drawing section comprises a suction nozzle connected to the sorting section through a suction unit, so that the suction nozzle sucks the processed particles and the unprocessed particles from the processing container to transfer the processed particles and the unprocessed particles to the sorting section.

2. The continuous particle manufacturing apparatus according to claim 1, wherein the particle returning section comprises an ejection nozzle configured to eject an air stream containing the unprocessed particles toward the inner wall surface of the processing container in a tangential direction or in an up-and-down direction of the processing container.

3. The continuous particle manufacturing apparatus according to claim 1, wherein the sorting section comprises a classification mechanism configured to sort the particles drawn by the particle drawing section into the processed particles and the unprocessed particles by a classification air stream.

4. The continuous particle manufacturing apparatus according to claim 3,
wherein the sorting section further comprises a cyclone mechanism, and
wherein the classification mechanism is connected to the particle drawing section and the particle returning section through the cyclone mechanism.

5. The continuous particle manufacturing apparatus according to claim 3,
wherein the sorting section further comprises a bypass passage connected to an upper portion of the classification mechanism, and a second particle returning section being communicable to the bypass passage, and
wherein, under a state in which the bypass passage and the second particle returning section communicate with each other, the classification air stream and a part of the unprocessed particles are returned into the processing container through the bypass passage and the second particle returning section.

6. The continuous particle manufacturing apparatus according to claim 5,
wherein the bypass passage is connected through a switching valve to the second particle returning section and a discharge passage linked to the discharge section,
wherein the switching valve is capable of switching communication of the bypass passage to the second particle returning section and the discharge passage between a state in which the bypass passage and the second particle returning section communicate with each other, and a state in which the bypass passage and the discharge passage communicate with each other,
wherein the upper portion of the classification mechanism is configured to be openable and closable by an on-off valve at a position above the bypass passage, and
wherein, under a state in which the bypass passage and the discharge passage communicate with each other by the switching valve and the upper portion of the classification mechanism is closed by the on-off valve, a discharge air stream stronger than the classification air stream is introduced into the classification mechanism, and the processed particles that remain in the classification mechanism are discharged by the discharge air stream to the discharge section through the bypass passage and the discharge passage.

7. The continuous particle manufacturing apparatus according to claim 1, further comprising a gas jet nozzle, which is installed on a wall portion of the processing container, and is configured to jet a gas so as to form a swirl stream that flows along the inner wall surface of the processing container in a circumferential direction of the processing container.

8. The continuous particle manufacturing apparatus according to claim 1, further comprising an impeller, which comprises an agitation blade, and is installed at a bottom of the processing container.

9. The continuous particle manufacturing apparatus according to claim 1, wherein
   the particle returning section comprises an ejection nozzle configured to eject the air stream containing the unprocessed particles toward the inner wall surface of the processing container in a tangential direction of the processing container,
   the suction nozzle is configured to suck the processed particles and the unprocessed particles from the processing container along a tangential direction of the processing container, and
   a suction force generated by the suction nozzle and an ejection force generated by the ejection nozzle act in a same peripheral direction of the processing container.

\* \* \* \* \*